Oct. 1, 1940.                L. F. CURTISS ET AL                2,216,161
             APPARATUS FOR MAKING METEOROLOGICAL OBSERVATIONS
                  Filed July 11, 1936         5 Sheets-Sheet 1

Inventors
Leon F. Curtiss,
Allen V. Astin,
BY John B. Brady
ATTORNEY

Patented Oct. 1, 1940

2,216,161

UNITED STATES PATENT OFFICE 2,216,161

APPARATUS FOR MAKING METEOROLOGICAL OBSERVATIONS

Leon F. Curtiss, Garret Park, Md., and Allen V. Astin, Washington, D. C.

Application July 11, 1936, Serial No. 90,234

6 Claims. (Cl. 177—380)

Our invention relates broadly to systems of radiometeorography and more particularly to apparatus for making meteorological observations.

One of the objects of our invention is to provide means for automatically transmitting radio signals according to characteristics of surrounding media at elevations above the surface of the earth to observing stations.

Another object of our invention is to provide a system of radiometeorography in which a radio transmitter may be dispatched by a free balloon to the higher altitudes and automatically controlled by the characteristics of surrounding media for transmitting to observing stations, sequence signals which may be accurately interpreted for forecasting conditions of the weather.

Still another object of our invention is to provide a construction of lightweight automatic radio transmitter having means for controlling the transmission of sequence signals according to characteristics of surrounding media and registering said sequence signals at an observing station for permitting accurate forecast of weather conditions.

Another object of our invention is to provide an electrically and mechanically driven timing mechanism which may be elevated into the upper atmosphere for continuously controlling the transmission of sequence signals representative of weather conditions to observing stations on the ground.

A further object of our invention is to provide a construction of radio transmitter adapted to be elevated by means of a free balloon and automatically controllable according to temperature, barometric pressure, and/or humidity conditions for transmitting sequence signals to observing stations having means for interpreting the sequence signals to provide accurate determinations of the said temperature, barometric pressure, and/or humidity conditions existing in the path of travel of the free balloon.

A still further object of our invention is to provide a construction of radiometeorograph observation apparatus in which a permanent record of temperature, barometric pressure, and/or humidity conditions is made upon a tape by readings which may be interpreted to accurately indicate conditions of temperature, barometric pressure, and/or humidity existing at the measuring position.

Other and further objects of our invention are to provide apparatus for making meteorological observations as set forth more fully in the specification hereinafter following, by reference to the accompanying drawings, in which:

Fig. 4 is a cross-sectional view taken through the radiometeorograph control mechanism with parts shown in side elevation; Fig. 5 is a top partial plan view of the mechanism shown in Fig. 4; Fig. 6 is a bottom partial plan view of the mechanism shown in Fig. 4 and illustrating the internal temperature measuring mechanism employed in the radiometeorograph of our invention; Fig. 7 illustrates in top plan view the arrangement of the temperature control mechanism for measuring temperature in the surrounding media external to the housing within which the radiometeorograph is enclosed; Fig. 18 is an elevational view of a modified form of radiometeorograph viewed from an opposite position with respect to the position in which Fig. 8 is taken; Fig. 19 is a horizontal sectional view of the form of radiometeorograph shown in Fig. 18, taken substantially on line 19—19 thereof and with parts illustrated in top plan view; Fig. 20 is a vertical sectional view of the radiometeorograph taken substantially on line 20—20 of Fig. 18.

Our invention is directed to a method and apparatus by which conditions of the weather may be forecast but which avoids the expense and hazards to persons and property heretofore involved in taking observations by daily aircraft flights. The cost of weather observations by aircraft flights in certain localities has been estimated at a minimum of $750.00 daily. Loss of life and aircraft greatly increases such cost. In the system of our invention, we have developed a lightweight radio transmitter attached to a balloon by which a half wave tuned doublet antenna with the radio transmitter attached thereto may be floatingly suspended in the air and allowed to ascend into the upper atmosphere. The radio transmitter is keyed by a control apparatus according to the characteristics of the surrounding media with respect to temperature, barometric pressure, and/or humidity. Signal impulses emitted by the transmitter are received at observing stations and translated to determine the temperature, barometric pressure, and/or humidity conditions at the measuring position. In developing the apparatus of our invention, we have been confronted with many obstacles, particularly the weight and size of the apparatus. We have succeeded in greatly reducing the size of the filament and plate batteries required. The complete apparatus for attachment to the balloon weighs less than two pounds. Signals have been transmitted clearly at altitudes of 23 kilometers (14.3 miles) and at distances of 80 miles. A method of direction finding may be employed at two or more observing stations in picking up the signals emitted by the transmitter suspended from the free balloon. We provide for the transmission of a timing signal for indicating on a tape record at the observing station, predetermined intervals of time during which the time operated mechanism of the radiometeorograph is continuously operated. Sequence signals are emitted intermediate the transmission of the timing signals, the time of emission of the sequence signals with respect to the timing signals being directly controlled by the characteristics of temperature, barometric pressure, and/or humidity in the media surrounding the radiometeorograph. Provision is made for enclosing the radiometeorograph within a protective housing. Separate elements are provided for controlling the transmission of sequence signals both in accordance with temperature internally of the protective housing and temperature externally of the protective housing. At the observation station, the sequence signals are printed on the tape record and the tape record is then removed from the recorder and directly applied to a calibrated measuring device capable of directly interpreting the position of the sequence signals on the tape in terms of barometric pressure, temperature internal and external of the protective housing, and/or conditions of humidity.

In selecting a frequency band for radiometeorographs, simplicity of construction led to the adoption of the 60 megacycle region for preliminary experiments. Such good results have been obtained that it seemed unnecessary to try other frequencies. It should be pointed out that the ultra-high frequencies are well suited to this work because of the absence of a reflected "sky wave" to complicate reception in producing fading and interfering with accurate direction finding. If one goes appreciably above 60 megacycles, however, difficulties are encountered in using ordinary commercial tubes, since the natural constants of such tubes play an important role in the oscillating circuits at these frequencies. The 60 megacycle region is free of this embarrassment while still retaining the advantage of using fairly short tuned half-wave doublet antennae and small coils and condensers, thus reducing weight. In addition, very sensitive receivers of simple design are already available at this frequency.

The system of our invention has many advantages among which, we may mention:

(1) An instantaneous record of the observations is made as fast as the balloon ascends. Recovery of balloon and equipment is not necessary to obtain the record as is the case when self-recording instruments are sent up.

(2) Records may be obtained in any kind of weather. This is not true of the most common method of observation used at present, that of taking instruments aloft in airplanes.

(3) Observations may be made easily to any altitude up to 20 kilometers. Airplanes usually ascend only to about 5 kilometers for weather observations.

(4) The equipment required is much less expensive and observations can, therefore, be obtained more cheaply than by use of airplanes.

Referring to the drawings in more detail, reference character 1 indicates the doublet antenna employed in the transmitter of our invention. The antenna comprises a single wire element which, in the form of our invention illustrated in Figs. 8, 9, 11 and 12, is 2.7 meters long which makes a single turn indicated at 2 around the outside of the tuning coils indicated at 3 and 4. This doublet antenna wire 1 is held taut by a light wooden bow 5 shown more particularly in Figs. 11 and 12. The doublet antenna 1 hangs vertically with respect to the free balloon 6 from which the radiometeorograph and associated parts are suspended by member 7. The assembly of bow 5 and doublet antenna 1 is suitably stabilized with respect to suspension member 7 by cord member 8 having a loop 9 through which suspension member 7 passes. Opposite ends of the doublet antenna wire 1 pass through the wooden bow 5 and are secured around the ends of the wooden bow 5 as indicated at 1a in Fig. 12.

Figure 1:
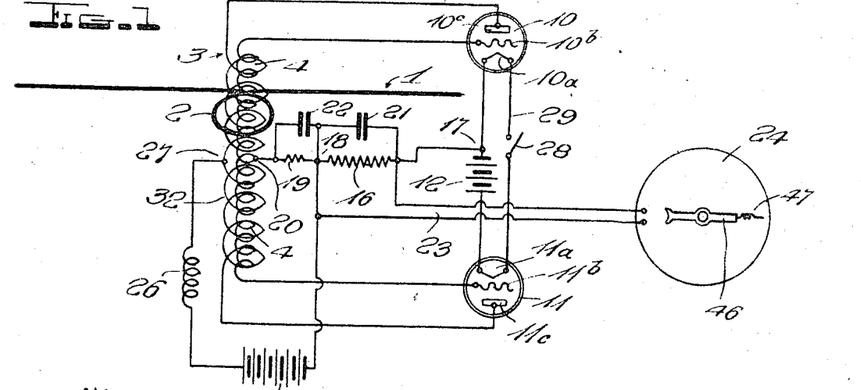
Figure 1 diagrammatically and schematically shows the electrical arrangement of the transmitter which is elevated by the free balloon for transmitting sequence signals according to the characteristics of surrounding media to the observing stations.

The radio transmitter comprises a push-pull oscillator using two electron tubes which we have indicated generally at 10 and 11 in Fig. 1. In the particular form of our invention illustrated, we use two of the '30 type receiving tubes arranged for operation on 5 meters. The push-pull oscillator of the transmitter of our invention is more stable in frequency and is especially convenient since the two filamentary cathodes 10a and 11a provide the proper load for three dry cells connected in series indicated at 12. Furthermore, the radio frequency output of such an oscillator can be made relatively high by using a high plate voltage, particularly when signals are desired in short pulses so that there is no danger of overheating the plates. Moreover, the weight of the additional tube is small. The low filament drain of these tubes permits the use of small-size flashlight cells in the filament circuit.

Figures 8, 9, 10:
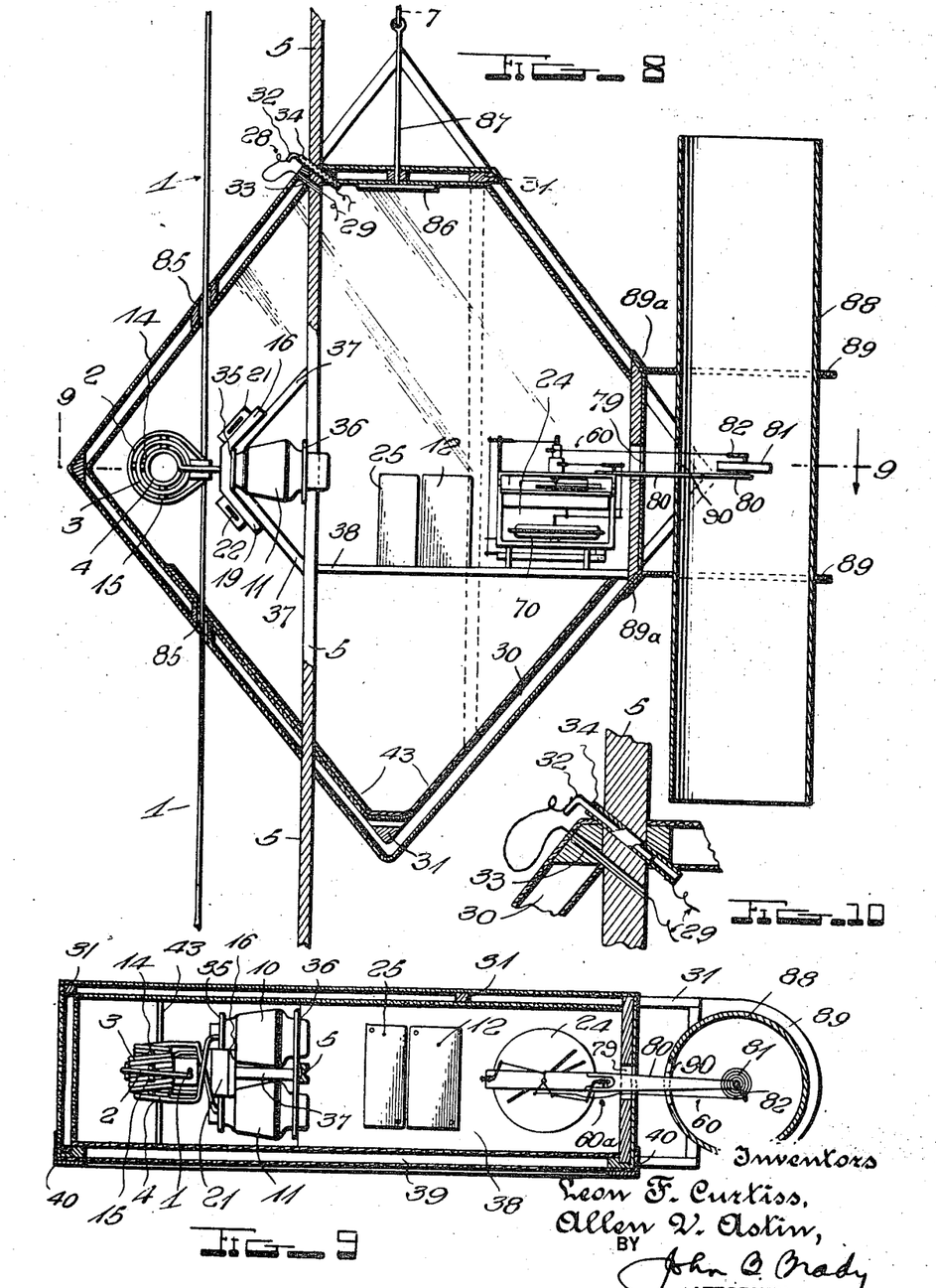
Fig. 8 is a vertical sectional view taken through the housing which encloses the radiometeorograph apparatus with equipment therein shown in elevation.
Fig. 9 is a horizontal view through the housing taken substantially on line 9—9 of Fig. 8 and showing certain of the equipment in top plan view.
Fig. 10 is a fragmentary view illustrating the transmitter power supply circuit control switch which is controllable from the exterior of the housing within which the radio transmitter and other parts of the radiometeorograph apparatus are substantially sealed.

Electron tubes 10 and 11 include in addition to the filamentary cathodes 10a and 11a respectively, the control grids 10b and 11b and the plate electrodes 10c and 11c. The plate electrodes 10c and 11c are connected to opposite ends of the inductance 3. The control grids 10b and 11b are connected to opposite ends of the inductance 4. Inductances 3 and 4 are wound concentrically one over the other and insulated from each other by means of blocks of insulation represented at 14. The single loop 2 in doublet antenna 1 concentrically surrounds inductance coils 3 and 4 as illustrated in Fig. 8 and is insulated and spaced therefrom by insulation blocks 15. The self capacity of the coils is employed for tuning the transmitting circuit. By precisely designing the coils 3, 4 and associating the coils in fixed special relation as described, we have found that it is possible to adjust the transmitter circuit very closely to the desired frequency without resort to a tuning condenser, thus saving the weight of the condenser structure under conditions where light weight is so essential. The plate and grid coils 3 and 4 are closely coupled and the coupling physically fixed as heretofore explained. The method of keying the transmitter circuit is highly important. Referring to Fig. 1, we have shown the cathode bias resistor 16 disposed between the point 17 in the filamentary cathode circuit and the point 18 which connects through a series path containing resistor 19 to the tap 20 on the grid circuit inductance 4. A condenser 21 is connected in shunt with the cathode bias resistor 16. Condenser 22 is connected in shunt with resistor 19. The keying circuit connections are taken on opposite sides of the cathode bias resistor 16 as represented at 23 leading to the radiometeorograph control mechanism indicated generally at 24. When the radiometeorograph is connected as illustrated, cathode bias resistor 16 is shorted on each contact permitting about fifty milliamperes to flow in the plate circuit. By introducing the control mechanism into the transmitter circuit in this way, the contacts are always shunted by cathode bias resistor 16 and the voltage at the contacts is low, thereby eliminating danger of arcing or sparking. Also, this arrangement prevents any undesirable change in the tuning as the contacts are made or broken. The plate circuit is completed from a connection from the end 18 of cathode bias resistor 16 through plate battery 25 and choke coil 26 to tap 27 on the plate circuit inductance 3. The transmitter is placed in operating condition by closing switch 28 in the filamentary cathode circuit 29. Switch 28 must be capable of operation from the exterior of the protective housing so that the transmitter may be placed in operation when the balloon is released for an ascension observation. As shown more particularly in Figs. 8–10, the radiometeorograph is contained within the multi-walled protective housing indicated generally at 30 formed on frame structure shown generally at 31. The switch 28 is in the form of a plug 32 shown more particularly in Fig. 10 permanently connected to one side of the filamentary cathode circuit 29 and normally adapted to rest in tubular socket 33 when the transmitter is not in operation. When the transmitter is to be placed in operation upon release of the balloon, the plug 32 is removed from tubular socket 33 and is inserted in tubular socket 34 which connects to one side of the filamentary cathode circuit 29 thus completing the circuit through the oscillator and initiating the circuit into operating condition.

For the purpose of reducing capacity effects and decreasing size and weight of the transmitter, we employ electron tubes 10 and 11 without the usual pin base structures. The tubes are maintained adjacent each other in compact assembly by means of an insulated panel 35 adjacent the wire terminal ends of the tubes and by interconnecting means 36 adjacent the other ends of the tubes. The leads from the electrodes within tubes 10 and 11 are brought out upon insulated panel 35 and directly connected with the associated parts of the circuit illustrated in Fig. 1. The condensers 21 and 22 and the resistors 16 and 19 are assembled in compact relation adjacent the panel 35 for decreasing the length of leads to a minimum.

The frame structure 31 supporting the enclosure 30 includes the angularly disposed struts 37 which support the electron tubes 10 and 11 with respect to bow 5. Laterally arranged shelf 38 extends through the enclosure and is supported by bow 5 and serves as a supporting means for the A battery 12 and the B battery 25 and as a supporting means for the timing mechanism indicated generally at 24. The struts 37 also provide means for supporting the electron tube assembly in position within the protective housing 30. The enclosing housing 30 has been generally described as multi-walled. We construct this housing very carefully from cellulose material which is stretched over the frame 31 with an external layer of cellulose material spaced from an internal layer of cellulose material. The cellulose material is substantially transparent, thus allowing light rays to pass freely through the protective housing. For the purpose of retaining heat rays which pass through the transparent wall structure of protective housing 30, we provide a metallic foil reflector illustrated at 43. The heat rays which pass through the transparent walls of the protective housing 30 strike the metallic foil reflector 43 interiorly of the protective housing 30 and are reflected to a central position within the protective housing where the average temperature internally of the housing is measured by the control mechanism of the radiometeorograph. The entire front multi-walled panel of the housing 30 is removable to allow access to the mechanism within the housing. When the front panel is mounted in position, it is substantially sealed at the periphery by means of suitable gummed tape as shown at 40.

The housing thus formed protects the transmitter and the control means within the housing from the extreme low temperatures of the higher altitudes so that they may function with a high degree of stability and accuracy. The temperature within the housing is maintained higher than that of the surrounding atmosphere as the apparatus ascends by virtue of the double walled heat insulating construction of the housing, and heat losses are recovered by the absorption of radiant energy within the structure received by virtue of the transparency of the covering of the housing. The amount of heat recovered is measured by the action of the reflectors 43 which provide additional radiant energy for absorption within the enclosure. In this manner temperatures of as high as 35° C. have been maintained within the enclosure during daytime operations while the outside temperature may be as low as —60° C. at altitudes of 40,000 feet or higher. Temperature measurement inside the enclosure is made in order that correction may be made in the results of the observations for errors introduced by irregularity in the operation of the transmitter and control apparatus due to temperature variations in accordance with previous calibrations.

The control mechanism of the radiometeorograph 24 is illustrated as including the time operated clock mechanism 45 mounted within the metallic band or strip 44 which encircles the time operated mechanism and forms a support for associated mechanism as will be hereinafter described. The time operated mechanism may be either spring actuated or electrically driven and is readily removable from and replaceable within the protective housing 30 for adjustment and repair. The removability of the wall 39 of the protective housing 30 as heretofore described permits insertion or removal of the control mechanism as required.

The time operated mechanism 45 drives a continuously moving sweep hand indicated at 46. The sweep hand 46 carries a resilient wire contact 47 on the end thereof which is adapted to make successive electrical connections with contacts connected in the keying circuit which we have indicated at 23 in Fig. 1. The sweep hand 46 forms one side of the keying circuit while the contacts coacting therewith are connected at the opposite side of the keying circuit. The coacting contacts are insulated from sweep hand 46 by mounting means which we have shown generally at 41 suitably insulated from metallic band or strip 44 as indicated at 48. The mounting means 41 carries depending wire contact members 49 and 50 disposed at spaced intervals and extending in the path of a resilient wire contact 47 carried by sweep hand 46. As sweep hand 46 in the course of its rotation passes wire-like contact members 49 and 50, the control circuit 23 is closed successively for two distinct time intervals. That is to say, when contact 47 strikes contact wire member 50, the control circuit to the transmitter is closed for emitting a signal impulse and then immediately opened as contact 47 leaves contact wire member 50 to be again subsequently closed as wire element 47 engages contact wire 49, thereby transmitting successive timing signals and producing a permanent record on the tape of the recording apparatus shown generally in Fig. 2 and illustrated specifically in Fig. 3. The effect of the timing signals on the tape record 51 is as illustrated at 52, 53 and 54, that is, recurring impressions or perforations on the tape 51, illustrating the lapse of uniform time intervals as sweep hand 46 is continuously driven by time operated mechanism 45.

The mounting means 41 includes a central bearing 55 in which a multiplicity of concentrically disposed sleeve members are journaled.

For purposes of explaining our invention, we have shown three concentric rotatable members journaled in bearing 55, but it will be understood that any additional number of rotatable members may be employed for securing measurements of other characteristics as will be hereinafter described in more detail. The rotatable members are illustrated as comprising rod member 56, concentrically arranged sleeve 57 and concentrically arranged sleeve 58. Each of the sleeves are arranged for independent angular rotation and each sleeve carries an actuating arm 56a, 57a, and 58a for effecting such angular adjustment according to variations in characteristics to be measured. Each of the separate rotatable members 56, 57 and 58 carry adjustable contact arms which we have illustrated at 56b, 57b and 58b.

The separate actuating arms 56a, 57a, and 58a are each controlled by means of motion transmitting members 59, 60 and 61 by separate devices responsive to changes in condition of surrounding media. For example, motion transmitting member 59 connects between actuating arm 56a and the end of angularly shiftable lever 62 pivoted on member 63 supported from the mounting means 41. The angularly shiftable lever 62 has an extended end 62a which is engaged by lever member 64 pivoted to band or strip 44 at 65. The end of lever 64 extends on the other side of the fulcrum 65 as indicated at 64a and is engaged by the end 66 of the bimetallic thermal element 67. The bimetallic thermal element 67 is secured at one end to the support 68 which projects from the strip 44. The bimetallic thermal element 67 is subjected to the temperature within the protective housing 30. Changes in such internal temperature arising as a result of the passage of the sun's rays and light rays through the transparent multi-walled structure of the protective housing, as reflected by the metallic foil reflector 43, serve to effect displacement of thermal element 67, imparting movement to the end 66 of thermal element 67, angularly displacing lever 64, imparting movement to the end 62a of lever 62, and transmitting movement through motion transmitting means 59 to actuating arm 56a and correspondingly turning rotatable member 56 for advancing or retracting the adjustable contact arm 56b in the path of the contact 47 carried by sweep hand 46.

The pressure element shown at 70 is suitably supported with respect to band or strip 44 and is subjected to atmospheric pressure within housing 30. The variations in pressure are transmitted through lever member 72 pivoted at 73. The inner end of lever member 72 indicated at 72a is connected to the actuating member 74 projecting from the pressure element 70. The movements due to variations in pressure transmitted through motion transmitting lever 72 are imparted to the end 75a of lever 75. Lever 75 is pivoted at 76 with respect to strip 44 and transmits movement to the end 77a of lever 77. Lever 77 is pivoted at 78 on mounting means 41. The end of lever 77 indicated at 77b is connected through motion transmitting member 61 to the end of actuating arm 58a. Rotary movement is imparted through arm 58a to rotatable sleeve 58 and from thence to contact arm 58b. Contact arm 58b has the end thereof projecting in the path of contact member 47 carried by sweep hand 46. As the pressure varies, the contact arm 58b is advanced or retracted in the path of the contact member 47 carried by sweep hand 46.

In order to measure temperature external to the protective housing 30, we provide a supporting member 80 attached to the strip 41 and projecting through the side wall of the protective housing 30. The member 80 provides a mounting means for a bimetallic thermal element indicated at 81 having one end fixed to the support 80 and the other end connected to a lever 82 free to swing about a pivot 83 as a center in accordance with the expansion or contraction of the bimetallic spiral element 81. The lever 82 which is angularly driven by the expansion or contraction of bimetallic thermal element 81 has the end thereof connected through motion transmitting member 60 which extends through the wall of the protective housing 30 and connects with the end of the actuating arm 57a. The arm 60 is suitably off set as indicated at 60a to allow movement thereof without interference with any of the parts of the associated mechanism. Variations in temperature external to the protective housing 30 cause movement of motion transmitting member 60 serving to angularly displace actuating arm 57a and revolve rotatable sleeve 57b for correspondingly shifting contact arm 57b and advancing or retracting the contact arm in the path of the contact element 47 carried by sweep hand 46. Changes in external temperature, accordingly, serve to advance or retract contact arm 57b in the path of sweep hand 46 thereby determining the time of transmission of a signal impulse representative of external temperature with reference to the timing signal.

In order that the external temperature may be accurately measured we provide a stack of metallic foil shown at 88 surrounding the spirally arranged thermal element 81. The stack 88 is open at both ends and extends substantially the vertical height of the housing 30. The stack 88 is supported immediately adjacent the frame 31 and is disposed between the laterally projecting apex portion of the frame as shown in Figs. 8 and 9. The stack 88 is maintained in position by a pair of members projecting laterally from frame 31 and embracing the stack 88. Members 89 are attached at one end to frame 31 as indicated at 89a and at the other end to the stack 88. The stack 88 substantially prevents the direct rays of the sun from falling upon the thermal element 81 due to the shielding action thereof and thus, because of the average temperature which stack 88 assumes, the thermal element 81 is enabled to respond to the average external temperature with a high degree of precision.

In order to allow passage of the supporting member 80 and the motion transmitting member 60 through the wall of the protective housing 30, and through the side wall of stack 88, suitable relatively narrow slots 79 and 90 are provided. Before an ascension, slots 79 are closed as nearly as possible by strips of adhesive tape secured to the side wall structure of the protective housing 30. The slots through the protective housing 30 through which the doublet antenna 1 extends as indicated at 85 are also maintained as small as practicable by means of suitably fitted patch members applied to the wall of the housing.

The protective housing 30 is centrally supported through a plate member 86 extending beneath the top portion of the frame 31 of protective housing 30 and connected through rod member 87 to the supporting member 7 connected to the free balloon 6.

The device for measuring humidity may be readily applied to the control mechanism and an additional contact arm journaled in the rotatable assembly and shifted to selected positions in the path of the contact element 47 as conditions of humidity change for thereby controlling the transmission of sequence signals.

In Figs. 18–21 we have illustrated a modified form of the apparatus of our invention wherein the bow 5 is eliminated and the doublet antenna 1 is moved to the center of the housing 30 and serves not only as the antenna but also as the means of support for the housing. The entire housing and equipment is extremely light in weight so that it may be readily suspended through the antenna 1. The doublet contains a turn 2 which passes around the windings 3 and 4 as heretofore explained. The lower portion of doublet 1 is weighted by a suitable weight 150. The upper portion of doublet 1 connects with the member 7 suspended by the balloon 6. A similar double wall transparent cellulose structure is provided for the housing with a removable side 39 as heretofore described. The transmitter and the time operated mechanism 24 are supported by a suitable laterally extending shelf 151 as shown. The doublet 1 has the lower portion thereof extending through a central aperture 152 in shelf 151. The transmitting apparatus, batteries and the time operated mechanism are distributed in such manner as to balance the housing during ascension.

Figure 21:
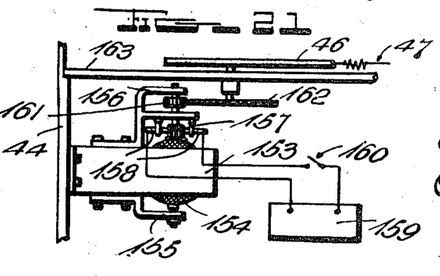
Fig. 21 shows schematically a form of electrically operated drive for the timing mechanism of the radiometeorograph.

As we have heretofore noted the time operated mechanism may be either spring driven or electrically driven. Fig. 21 shows an arrangement of an electrically driven time operating mechanism. A light weight motor is supported on band or strip 44 through frame 153 which serves as a field magnet for the motor having armature 154 journaled in bearings 155 and 156. The commutator 157 on the armature shaft coacts with brushes 158 through which energy is supplied from battery 159 for driving the motor when starting switch 160 is closed. We have found that a motor of size and weight within the limitations allowed may be driven from a battery of the size and weight allowed for a period of approximately six hours which is adequate for purposes of the observations for which the apparatus of our invention is required. A pinion 161 carried by the motor shaft engages a gear 162 mounted on the shaft with the sweep hand 46 and serves as a speed reduction gear system for driving the sweep hand 46 at a predetermined uniform rate. Suitable mounting means 163 is provided for the journal in which the sweep hand 46 operates. The electrical and spring driven mechanism may be employed interchangeably.

Figure 2:
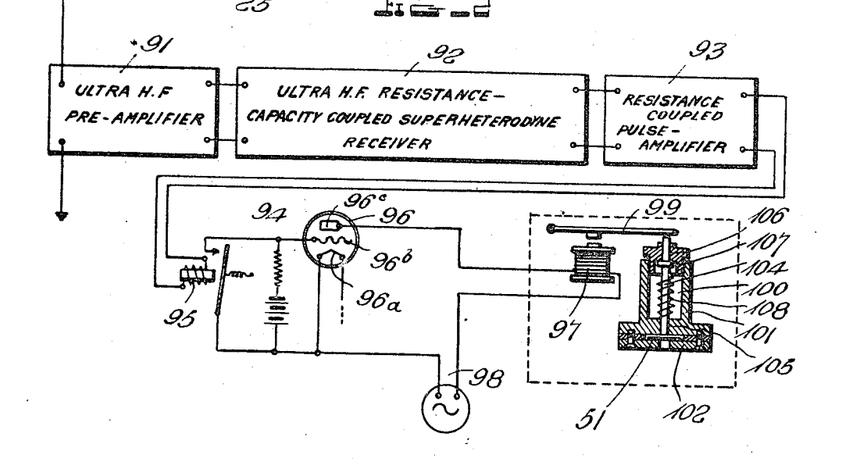
Fig. 2 is a diagrammatic and schematic view showing the radio receiving apparatus employed at an observing station including the record perforating mechanism and the electrical circuit which controls the operation of the record perforating mechanism.
Figure 3:
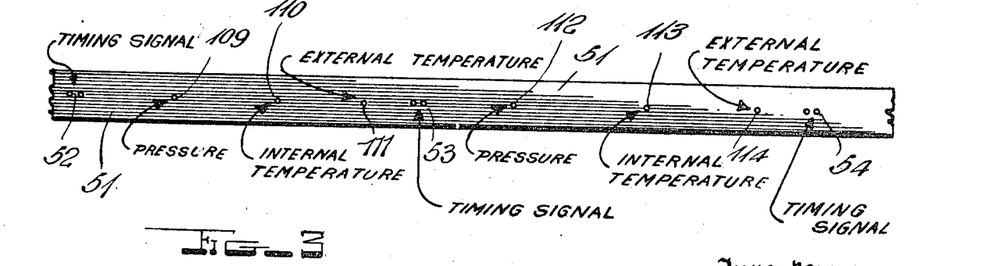
Fig. 3 illustrates a portion of the tape record on which the sequence signals indicating conditions of temperature, barometric pressure, and/or humidity at the measuring position are recorded on the tape record at the observing station.

At the observing station, we provide a high frequency signal receiving system indicated diagrammatically in Fig. 2. The receiving antenna and ground connection is shown connected to the ultra-high frequency pre-amplifier 91. The output of the ultra-high frequency pre-amplifier 91 connects to the ultra-high frequency resistance-capacity coupled superheterodyne receiver indicated at 92. The output of the receiver 92 connects to the resistance coupled pulse amplifier 93. The pulse amplifier 93 has its output connected to the thyratron control circuit indicated generally at 94. The control relay 95 operates an armature in accordance with the received signal impulses which controls the potential upon grid 96b of thyratron 96. The thyratron 96 contains cathode 96a, grid 96b, and anode 96c. The output circuit of thyratron 96 contains actuating winding 97 of the punch control solenoid and the alternating current power source indicated generally at 98. The punch control solenoid 97 operates an armature 99 which controls the tape perforator mechanism shown generally at 100. The tape perforator mechanism includes a housing 101 which carries a tape guide 102 adjacent the base slotted to allow the tape 51 to be moved therethrough. The punch housing 101 has a punch member 104 extending therethrough guided by means of the apertured head 105 and guided through the detachable head 106. The punch member 104 has a flange 107 thereon against which the spiral spring 108 acts to normally maintain the punch member 104 in elevated position ready to be moved to perforating position as armature 99 is attracted by solenoid 97, whereupon punch member 104 cuts through the tape 51 forming a perforation therein. The perforations in the tape 51 formed upon receipt of the timing impulses have already been explained and indicated at 52, 53 and 54 in Fig. 3. As the contact arm between contact arm 47 and contact arm 58b is the first contact which is made after sweep hand 46 passes timing contacts 49 and 50, the first signal impulse will be an indication of pressure and, as represented in Fig. 3, tape 51 will be perforated at 109 to indicate a pressure reading. Contact arm 47 will next make connection with contact arm 56b providing a reading of internal temperature as indicated by perforation 110 in tape 51. Contact element 47 carried by sweep hand 46 then makes connection with contact arm 57b providing a reading of external temperature and forming a perforation 111 in tape 51. The timing impulses are next received as indicated by the perforations 53 in the tape 51. The measurements are then repeated and perforations obtained in succession at 112 for indicating pressure conditions, 113 for indicating internal temperature, and 114, for indicating external temperature.

The sequence signals are repeated. Each successive reading may vary considerably from the earlier readings and the position of the perforations may be advanced or retarded along the tape, the distance and spacial relation of such perforations providing an accurate measure of the conditions at the measuring position. It will be clear that a measurement with respect to humidity conditions will also appear as a perforation on the tape upon receipt of a sequence signal, depending upon conditions of humidity by the addition of the necessary arm and contact device controlled thereby as heretofore explained.

In order to interpret the sequence readings on the tape 51, we provide a special apparatus represented in Figs. 13–17. A flat supporting surface 115 provides a carrier for a curve chart 116. Complementary sets of substantially semi-circular members 117 are arranged to be detachably mounted adjacent the flat supporting surface 115 on opposite sides of laterally projecting lug members 118 projecting from the bracket 119 which is secured adjacent the peripheral edge of the supporting surface 115. The curved peripheral edges of the complementary members 117 provide a support against which the paper tape 51 is adapted to be laid. The sets of curved peripheral members 117 form parallel extending flat surfaces between which the projecting end of arm 120 is adapted to swing. The arm 120 is fulcrumed at 121 in bracket 119 and has a forwardly extending portion 123 adapted to sweep over the curve chart 116 and a rearwardly extending portion 124 adapted to sweep between the parallel extending surfaces of the complementary members 117. The end of the arm 120 terminates in a pin 125 adapted to enter perforations in tape 51. The arm 120 is normally biased to a predetermined position with respect to curve chart 116 by means of flat spiral spring 126 which extends between the axis member on which arm 120 is supported and the bracket 119. The forwardly extending portion of arm 120 is calibrated on each side thereof, the scale on one side indicated at 127 reading in terms of temperature and the scale on the opposite side indicated at 128 reading in terms of pressure. Predetermined curves shown at 129 and 130 and 131, prepared on the curve chart 116, are standardized for cooperation with the calibrated scales 127 and 128 so that upon angular movement of arm 120 in any position over curve chart 116, the temperature or pressure reading may be directly determined by reading the intersection of the curves 129, 130 or 131 with the calibrated scales 127 or 128 respectively. The method of angular interpretation of the sequence readings on the tape record 51 is carried out by attaching the tape record 51 at a position adjacent the set of curved members 117 as indicated at 132. A pin 133 is located at the position 132 on one of the members 117 and projects through the first of the timing perforations 52 in tape 51. The tape 51 is then stretched around the curved peripheral edges of members 117 and the sequence perforations successively placed over pin 125 allowing the arm 120 to be moved to a position where tape 51 is drawn taut against the peripheral edges of members 117 allowing a reading to be made of the particular sequence signal, the reading being determined by observing the intersection of the respective calibrated scales with the representative curves on chart 116. That is to say the pin 125 may be projected through the pressure perforation 109 and arm 120 swung to a limiting position and the reading immediately interpreted by noting the intersection of scale 128 with pressure curve 129. Correspondingly, pin 125 may be projected through perforations 110 and 111 respectively and successive readings taken after arm 120 has been swung to stretch the tape 51 taut by observing the intersection of scale 127 with the internal temperature curve 130 or the external temperature curve 131 respectively. In this way rapid interpretations of the readings on the tape may be effected. As the spacial relation of the perforations along the length of the tape from the perforations representing timing impulses varies, changes in the readings may be readily noted from the scale readings as heretofore explained.

It will be readily understood that a curve showing humidity conditions may be added to the curve chart for similarly interpreting perforations on the tape representative of humidity conditions.

Figures 11, 12, 13, 14, 15, 16, 17:
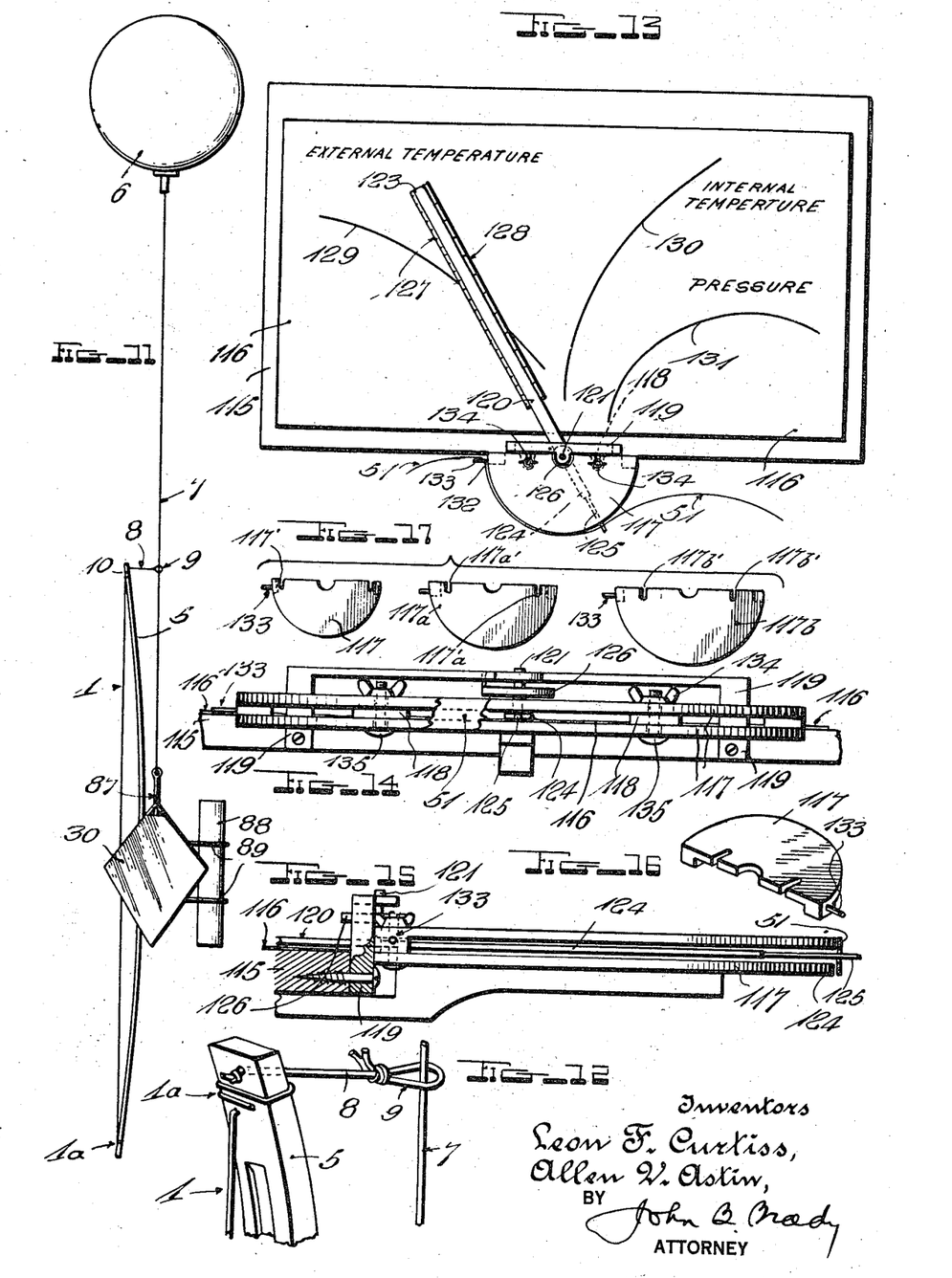
Fig. 11 is a side elevational view showing the radiometeorograph apparatus elevated by a free balloon.
Fig. 12 is a fragmentary perspective view of the upper end of the transmitting antenna doublet employed in association with the radiometeorograph apparatus and showing the manner of attachment to the free balloon.
Fig. 13 is a plan view of the equipment employed at the observing station for interpreting the sequence signals recorded on the tape at the observing station.
Fig. 14 is an enlarged front elevational view of the apparatus for interpreting the sequence readings on the tape record.
Fig. 15 is a side elevational view of the apparatus shown in Fig. 14 and illustrating the manner in which the tape carrying the sequence signals recorded thereon is applied to the measuring apparatus for interpreting the sequence signals recorded thereon.
Fig. 16 is a perspective view of one of the preformed plates against which the tape is applied in interpreting the records thereon.
Fig. 17 illustrates a set of corrective preformed plates which are interchangeably attachable to the measuring apparatus for applying predetermined corrections under predetermined conditions for interpreting the readings on the tape.
Figures 18, 19, 20:
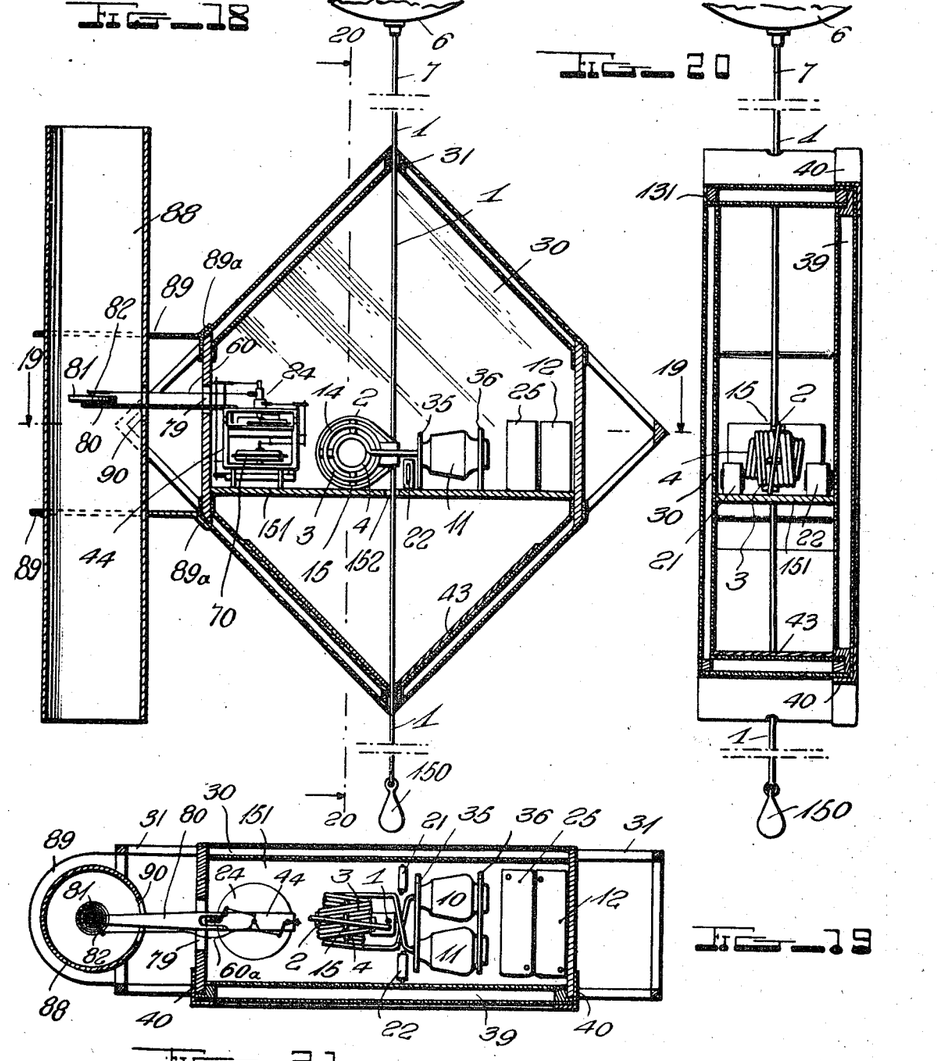

Because of the many variables involved, we find it necessary to prepare several sets of complementary members 117 as indicated in Fig. 17 at 117a and 117b of varying radii to be used for making readings over differing temperature pressure or humidity ranges. To allow quick interchange of the sets of complementary members adjacent the chart 116 we provide slots in the peripheral edges of the complementary sets of members 117 as indicated at 117', 117a' and 117b' respectively which coact with the quick removable wing nut devices 134 which engage bolts 135 extending through the projecting lug members 118. For making readings under differing conditions, the wing nuts 134 may be removed, the bolts 135 withdrawn, the set of complementary members 117 removed and the desired set substituted and the bolts again replaced and the wing nuts 134 secured in position.

We have found the system of our invention highly efficient and practical in the determination of meteorographic data. We appreciate, however, that modifications may be made in the method and apparatus employed and it is not our intention to limit our invention to the particular form disclosed herein. We intend no restrictions upon our invention other than may be imposed by the scope of the appended claims.

What we claim as new and desire to secure by Letters Patent of the United States is as follows:

1. Meteorological apparatus comprising a frame structure, a substantially transparent enclosure carried by said frame structure, means for concentrating light rays and the heat incident thereto within said enclosure, a radio transmitter carried by said frame structure and mounted within said substantially transparent enclosure, an opaque tubular member open at the ends supported by said frame structure externally of said substantially transparent enclosure, and a control device mounted in said tubular member and operating to control the transmission of signals from said radio transmitter within said enclosure, the transparency of said enclosure permitting the passage of light rays therethrough and the opacity of said tubular member excluding light rays to effect desired different temperature conditions in said housing and said tubular member.

2. Meteorological apparatus comprising a frame structure, a substantially transparent enclosure carried by said frame structure, means for concentrating light rays and the heat incident thereto within said enclosure, a radio transmitter disposed within said enclosure, a device mounted adjacent said radio transmitter for controlling the operation of said radio transmitter according to meteorological conditions within said enclosure subject to the effect of light rays admitted thereto, a support extending from said frame structure, an antenna mounted on said support and connected with the radio transmitter within said enclosure, and means for floatingly suspending said enclosure and effecting the ascension thereof into the upper atmosphere.

3. Meteorological apparatus comprising a frame structure having substantially transparent walls for the passage of light rays therethrough, a radio transmitter mounted within said frame structure, control means mounted adjacent said radio transmitter for controlling the operation thereof according to meteorological conditions within said frame structure subject to the effect of light rays admitted thereto, means for concentrating light rays and the heat incident thereto within said frame structure, and means for floatingly suspending said frame structure and effecting the ascension thereof.

4. Meteorological apparatus comprising a lightweight frame structure adapted to be elevated into the upper atmosphere, transparent wall members for said frame structure for permitting the passage of light rays therethrough, a lightweight radio transmitter mounted within said frame structure, control means mounted adjacent said radio transmitter for controlling the operation thereof according to meteorological conditions within said frame structure subject to the effect of light rays admitted thereto, and means carried by said frame for concentrating light rays and heat incident thereto within said frame structure.

5. Meteorological apparatus comprising a frame structure having a double wall of transparent cellulose material, transverse supporting means in said frame structure having a radio transmitter including battery sources of power and control means mounted thereon, said control means comprising a rotatable contact driving mechanism and a plurality of movable contact actuating means operable in accordance with meteorological conditions, a portion of the wall of said frame structure comprising a block member apertured adjacent said control means, one of said actuating means being disposed exterior of said frame structure and connected with said control means through said apertured block member, means for floatingly suspending said frame structure and effecting elevation thereof into the upper atmosphere; said double walled frame structure being effective substantially to insulate said transmitter, said battery sources of power and said control means from external temperature conditions; and a reflector foil lining of the lower portion of the inner wall for concentrating light rays and the heat incident thereto within said frame structure.

6. Control apparatus for a signal transmitter adapted to be carried by a free balloon which comprises a frame, a watch type driving mechanism and a drum type barometric pressure device mounted in spaced parallel relation in said frame, a rotatable contact driven by said driving mechanism in a plane parallel to said driving mechanism, a movable contact disposed in the path of said rotatable contact and adjustable coaxially therewith, and link means disposed on said frame and connected between said movable contact and said barometric pressure device for actuating said movable contact, said link means including crank means for converting the axial movement of said drum type device into circumferential movement for actuating said movable contact.

LEON F. CURTISS.
ALLEN V. ASTIN.